United States Patent
Nowinski

(10) Patent No.: US 6,941,259 B2
(45) Date of Patent: Sep. 6, 2005

(54) LASER SOFTWARE CONTROL SYSTEM

(75) Inventor: Gunter Nowinski, Goettingen (DE)

(73) Assignee: Lamda Physik AG, Goettingen (DE)

( * ) Notice: Subject to any disclaimer, the term of this patent is extended or adjusted under 35 U.S.C. 154(b) by 820 days.

(21) Appl. No.: 09/791,432

(22) Filed: Feb. 22, 2001

(65) Prior Publication Data

US 2001/0032066 A1 Oct. 18, 2001

Related U.S. Application Data

(60) Provisional application No. 60/186,011, filed on Mar. 1, 2000.

(51) Int. Cl.[7] ............................ G06F 9/45; G05B 13/02; H01S 3/00
(52) U.S. Cl. ............................... 703/22; 703/2; 700/31; 700/32; 372/33; 372/57; 714/47
(58) Field of Search ....................... 372/57, 33; 716/21; 714/47, 747, 798; 703/2, 22, 13, 14; 700/28–32, 97, 100, 119, 120, 121, 166

(56) References Cited

U.S. PATENT DOCUMENTS

| | | | |
|---|---|---|---|
| 4,393,505 A | 7/1983 | Fahlen | 372/57 |
| 4,399,540 A | 8/1983 | Bücher | 372/20 |

(Continued)

FOREIGN PATENT DOCUMENTS

| | | | |
|---|---|---|---|
| DE | 38 42 492 A1 | 6/1990 | H01S/3/097 |
| DE | 298 22 090 U1 | 3/1999 | H01S/3/08 |

OTHER PUBLICATIONS

Yao et al., R.L. Measurements and Simulation of Controlled Beamfront Motion in the Laser Control Accelerator, IEEE, Proceedings of the Particle Accelerator Conference, Mar. 1989, pp. 624–626.*

Yao et al., R.L. Numerical Simulation of Collective Ion Acceleration in the Laser Controlled Collective Accelerator, IEEE International, Plasma Science, May 1989, p. 56.*

R. Sadgighi–Bonabi, et al., "Gain and saturation of the atomic fluorine laser".

*Primary Examiner*—Russel Frejd
(74) *Attorney, Agent, or Firm*—Stallman & Pollock LLP

(57) ABSTRACT

A first software program for simulating an operating laser system controls a processor that generates one or more dummy parameters each corresponding to a parameter of an operating laser system. The dummy parameter is read over a same or similar signal interface as the operating laser system by a processor running a test software subroutine having the laser system parameter as an input. An algorithm including the test software subroutine then generates an output command based on the value of the dummy parameter. A second software program for efficiently scheduling laser service routines based on a predetermined lithography system schedule controls a processor that reads the lithography system schedule including scheduled system downtimes, wherein the scheduled downtimes include start times and durations. The processor then reads a time window and duration for each of one or more scheduled laser service routines. The processor then determines a start time for each scheduled laser service routine within the time window of the service routine, wherein the start times are selected to collectively maximize temporal overlap of the scheduled laser service routine durations and scheduled system downtime durations. A third software program including a flow control kernel controls a processor to receive a unique command from one of multiple external software control programs corresponding to a function of a laser system and input the unique command to the flow control kernel. The flow control kernel outputs a generic command that is the same for each unique input command of the multiple external software control programs corresponding to the same laser system function. The generic command or command sequence is then input to a generic control module corresponding to the laser system function.

9 Claims, 3 Drawing Sheets

U.S. PATENT DOCUMENTS

| | | | |
|---|---|---|---|
| 4,829,536 A | 5/1989 | Kajiyama et al. | 372/57 |
| 4,856,018 A | 8/1989 | Nozue et al. | 372/98 |
| 4,860,300 A | 8/1989 | Bäumler et al. | 372/57 |
| 4,905,243 A | 2/1990 | Lokai et al. | 372/32 |
| 4,975,919 A | 12/1990 | Amada et al. | 372/33 |
| 4,977,573 A | 12/1990 | Bittenson et al. | 372/81 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,226,050 A | 7/1993 | Burghardt | 372/20 |
| 5,247,531 A | 9/1993 | Müller-Horsche | 372/38 |
| 5,396,514 A | 3/1995 | Voss | 372/57 |
| 5,404,366 A | 4/1995 | Wakabayashi et al. | 372/29 |
| 5,559,816 A | 9/1996 | Basting et al. | 372/27 |
| 5,596,596 A | 1/1997 | Wakabayashi et al. | 372/102 |
| 5,646,954 A | 7/1997 | Das et al. | 372/55 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,565 A | 3/1998 | Meller et al. | 372/87 |
| 5,761,236 A | 6/1998 | Kleinschmidt et al. | 372/100 |
| 5,818,865 A | 10/1998 | Watson et al. | 372/86 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/20 |
| 5,917,849 A | 6/1999 | Ershov | 372/102 |
| 5,946,337 A | 8/1999 | Govorkov et al. | 372/92 |
| 5,970,082 A | 10/1999 | Ershov | 372/102 |
| 5,978,409 A | 11/1999 | Das et al. | 372/100 |
| 5,999,318 A | 12/1999 | Morton et al. | 359/572 |
| 6,005,880 A | 12/1999 | Basting et al. | 372/38 |
| 6,016,325 A | 1/2000 | Ness et al. | 372/38 |
| 6,020,723 A | 2/2000 | Desor et al. | 320/166 |
| 6,061,382 A | 5/2000 | Govorkov et al. | 372/101 |
| 6,081,542 A | 6/2000 | Scaggs et al. | 372/70 |
| 6,151,346 A | 11/2000 | Partlo et al. | 372/38 |
| 6,157,662 A | 12/2000 | Scaggs et al. | 372/60 |
| 6,160,831 A | 12/2000 | Kleinschmidt et al. | 372/57 |
| 6,160,832 A | 12/2000 | Kleinschmidt et al. | 372/57 |
| 6,324,196 B1 | 11/2001 | Desor | 372/30 |
| 6,700,916 B1 * | 3/2004 | Kramer et al. | 372/57 |
| 2001/0020195 A1 | 9/2001 | Patel et al. | 700/121 |

* cited by examiner

LASER SOFTWARE CONTROL SYSTEM

PRIORITY

This application claims the benefit of priority to U.S. Provisional patent application No. 60/186,011, filed Mar. 1, 2000.

BACKGROUND

1. Field of the Invention

The invention relates to laser software control systems and software, and particularly to a control system that facilitates laser control software development for R & D stage lasers, increases laser system uptimes and reduces control system software development time and costs.

2. Discussion of the Related Art

Semiconductor manufacturers are currently using deep ultraviolet (DUV) lithography tools based on KrF-excimer laser systems operating around 248 nm, as well as the following generation of ArF-excimer laser systems operating around 193 nm. Vacuum UV (VUV) will use the $F_2$-laser operating around 157 nm.

The short wavelengths are advantageous for photolithography applications because the critical dimension (CD), which represents the smallest resolvable feature size producible using photolithography, is proportional to the wavelength. This permits smaller and faster microprocessors and larger capacity DRAMs in a smaller package. The high photon energy (i.e., 7.9 eV) is also readily absorbed in high band gap materials like quartz, synthetic quartz ($SiO_2$), Teflon (PTFE), and silicone, among others, such that the excimer and molecular fluorine lasers have great usefulness presently and even greater potential in a wide variety of materials processing applications.

Higher energy, higher efficiency excimer and molecular fluorine lasers are being developed as lithographic exposure tools for producing very small structures as chip manufacturing proceeds into the 0.18 micron regime and beyond. Making smaller chips faster involves synchronistic improvements in silicon processing, imaging systems and the radiation exposure sources (the lasers). Specific characteristics of laser systems sought to be improved upon in accord with these goals particularly for the lithography market include higher repetition rates, increased energy stability and dose control, increased percentage of system uptime, narrower output emission linewidths, improved wavelength calibration, and improved compatibility with stepper/scanner imaging systems.

Various components and tasks relating to today's lithography laser systems are increasingly designed to be computer- or processor-controlled. The processors are programmed to receive various inputs from components within the laser system, and to signal those components and others to perform adjustments such as gas mixture replenishment, discharge voltage control, burst control, alignment of resonator optics for energy, linewidth or wavelength adjustments, among others, and adjustments having to do with interfacing with the imaging system.

Many of the control procedures that the processors of these laser systems are involved in are "feedback" subroutines. That is, a parameter is monitored and the same or a different parameter is controlled by processor commands to system components based on the value of the monitored parameter. Often the processor commands that control the controlled parameter also affect the monitored parameter, they are the same parameter, and thus the feedback subroutines are continuously monitoring and adjusting the system.

It is recognized in the present invention, that there is a difficulty with developing software control programs particularly for feedback subroutines for use with laser systems that are still in the R & D stage and not yet fully operational. That is, input parameters cannot be received by the processor from a fully operational laser system, which is the intended purpose of the feedback control software being developed, until a working laser is actually up and running. At the same time, it presents an undesirable delay in the marketing of new, improved lasers when software development for the processor control of the new lasers is undertaken only after the laser hardware package is otherwise fully developed. It is desired to have a way to develop processor control software for next generation industrial lasers in parallel with the development of the lasers themselves.

Both the chip production processing and the operation of the laser system require some specifically ascribed downtime periods. For the chip processing, maybe the masks or reticles need to be aligned or changed, the substrate sheets changed or the imaging optics adjusted. For the laser system, maybe a new gas fill or partial gas replacement, or scheduled service on the optics or electrical system is required, or beam alignment or wavelength calibration requiring some offline servicing is expected.

The imaging system and/or chip manufacturer typically informs the laser manufacturer what the processing schedule (time schedule for periods of exposure and non-exposure, or uptimes and downtimes) will be for a particular customer order. It is recognized in the present invention that both the laser system and chip processing downtime periods work against the overall goal of maximizing the uptime of the overall system. While some downtime may be unavoidable due to scheduled or unexpected servicing needs of the system, it is desired to have a system where only the minimum amount of downtime is incurred for scheduled servicing of the system.

Each customer who orders a lithography laser system typically supplies a list of commands or command sequences corresponding to various functions required of the laser that are input to the control processor of the laser from an external controller, e.g., at the fab. Each customer typically assigns a different command or command sequence to common functions of the laser system. Software packages including unique laser control modules for each different customer's command/command sequence list are conventionally created consuming a large amount of software development time and cost. It is desired to reduce this software development time and cost.

SUMMARY OF THE INVENTION

It is therefore a first object of the invention to provide a software development technique wherein processor control software for next generation industrial lasers may be developed while the lasers themselves are being developed.

It is a second object of the invention to provide a photolithographic processing system wherein a reduced amount of downtime is incurred for scheduled servicing of the system.

It is a third object of the invention to reduce the time and cost of developing processor control software for photolithographic processing systems.

In accord with the first object, a method and software program for simulating an operating laser system is provided in accord with a first aspect of the invention. The program generates one or more dummy parameters each corresponding to a parameter of an operating laser system. The dummy parameter is read over a same or similar signal interface as the operating laser system by a processor running a test software subroutine having the laser system parameter as an input. An algorithm including the test software subroutine then generates an output command based on the value of the dummy parameter. The dummy parameter is preferably closely estimated to be the value of the laser system parameter to which it corresponds. The algorithm having the laser system parameter as an input may be advantageously developed and tested separately from the operating laser system.

In accord with the second object, a method and software program for efficiently scheduling laser service routines based on a predetermined lithography system schedule is provided in accord with a second aspect of the invention. A processor reads the lithography system schedule including scheduled system downtimes, wherein the scheduled downtimes include start times and durations. The processor then reads a time window and duration for each of one or more scheduled laser service routines. The processor then determines a start time for each scheduled laser service routine within the time window of the service routine, wherein the start times are selected to collectively maximize temporal overlap of the scheduled laser service routine durations and scheduled system downtime durations. The processor then writes a start time for each scheduled laser service routine.

In accord with the third object, a software program is provided including a flow control kernel in accord with a third aspect of the invention. A command or command sequence unique to one of multiple external software control programs corresponding to a function of a laser system is read and input to the flow control kernel. The flow control kernel outputs a generic command or command sequence that is the same for each unique input command or command sequence of the multiple external software control programs corresponding to the same laser system function. The generic command or command sequence is then input to a generic control module corresponding to the laser system function. The kernel may include a universal translator or translator table. Advantageously, only one set of generic control modules may be used with all of the multiple external software control programs.

DETAILED DESCRIPTION OF THE PREFERRED EMBODIMENTS

Figure 1:
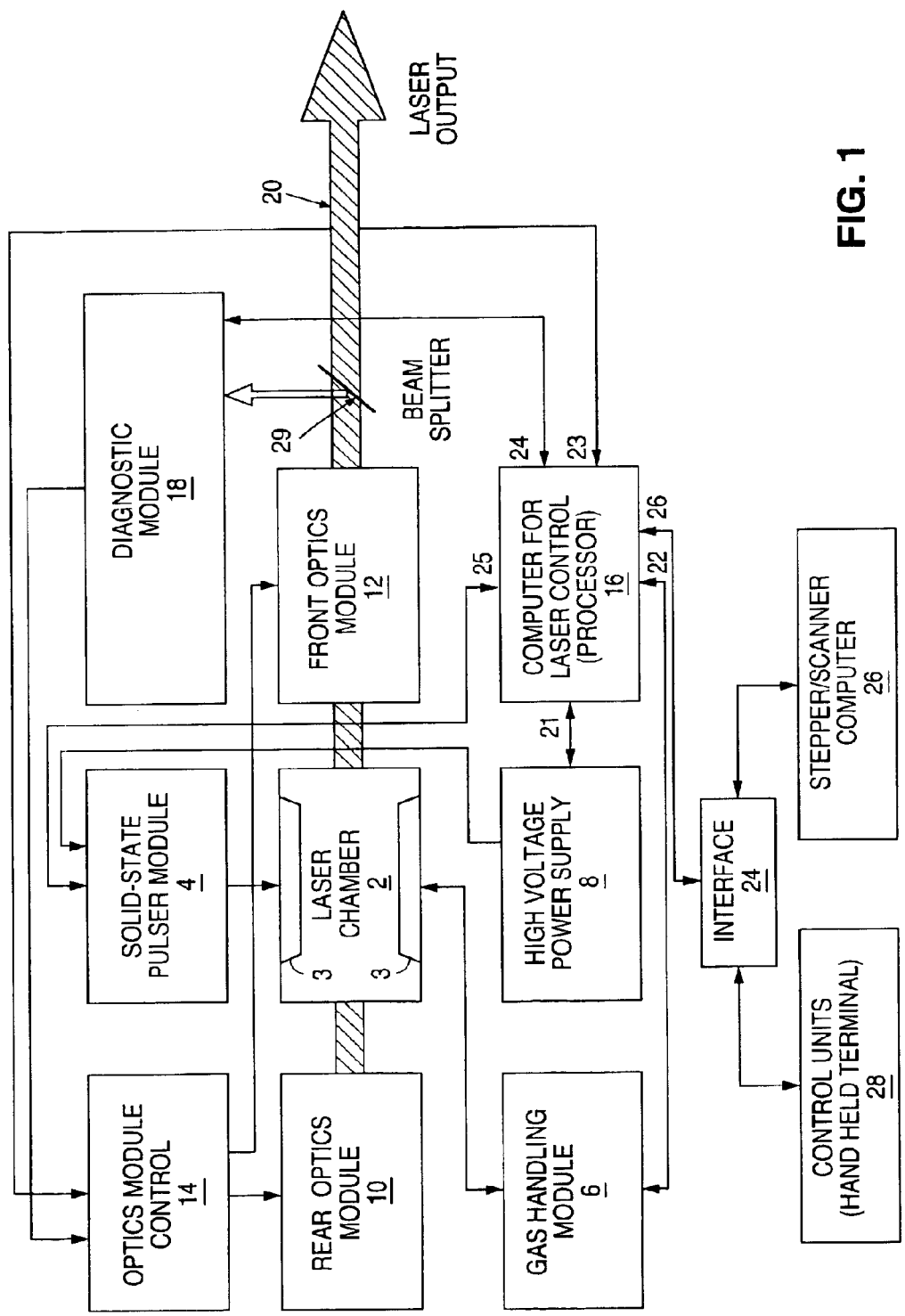
FIG. 1 schematically illustrates an operating excimer or molecular fluorine laser system.

FIG. 1 schematically shows a laser system in accord with a preferred embodiment. The system includes a laser chamber 2 filled with a gas mixture and having a pair of main electrodes 3 and one or more preionization electrodes (not shown). The electrodes 3 are connected to a solid-state pulser module 4. A gas handling module 6 is connected to the laser chamber 2. A high voltage power supply 8 is connected to the pulser module 4. A laser resonator is shown including the laser chamber 2 and a rear optics module 10 and a front optics module 12. An optics control module 14 communicates with the rear and front optics modules 10, 12. A computer or processor 16 controls various aspects of the laser system. A diagnostic module 18 receives a portion of the output beam 20 from a beam splitter 29.

The gas mixture in the laser chamber 2 typically includes about 0.1% $F_2$, 1.0% Kr and 98.8% Ne for a KrF-laser, 0.1% $F_2$, 1.0% Kr and 98.8% Ne and/or He for an ArF laser, and 0.1% $F_2$ and 99.9% Ne and/or He for a $F_2$ laser (for more details on the preferred gas mixtures, see U.S. Pat. Nos. 4,393,505, 4,977,573 and 6,157,162 and U.S. patent application Ser. Nos. 09/447,882, 09/418,052, 09/688,561, 09/416,344, 09/379,034, 09/484,818 and 09/513,025, which are assigned to the same assignee as the present application and are hereby incorporated by reference). The laser system may be another gas discharge laser such as a KrCl, XeCl or XeF excimer laser. A trace amount of a gas additive such as xenon, argon or krypton may be included (see the '025 application, mentioned above).

One or more beam parameters indicative of the fluorine concentration in the gas mixture, which is subject to depletion, may be monitored, and the gas supply replenished accordingly (see the applications mentioned above). The diagnostic module 18 may include the appropriate monitoring equipment or a detector may be positioned to receive a beam portion split off from within the laser resonator (see the '052 application). The processor 16 preferably receives information from the diagnostic module 18 concerning the halogen concentration and initiates gas replenishment action such as micro-halogen injections, mini and partial gas replacements, and pressure adjustments by communicating with the gas handling module 6.

Although not shown, the gas handling module 6 has a series of valves connected to gas containers external to the laser system. The gas handling module 6 may also include an internal gas supply such as a halogen and/or xenon supply or generator (see the '025 application). A gas compartment (not shown) may be included in the gas handling module 6 for precise control of the micro halogen injections (see the '882 application, mentioned above, and U.S. Pat. No. 5,396,514, which is assigned to the same assignee as the present application and is hereby incorporated by reference).

The wavelength and bandwidth of the output beam 20 are also preferably monitored and controlled. Preferred wavelength calibration apparatuses and procedures are described at U.S. Pat. Nos. 6,160,832 and 6,160,831, which are hereby incorporated by reference. The monitoring equipment may be included in the diagnostic module 18 or the system may be configured to outcouple a beam portion elsewhere such as from the rear optics module 10, since only a small intensity beam portion is typically used for wavelength calibration (see the '344 application).

Preferred main electrodes 3 are described at U.S. patent application Ser. No. 09/453,670, which is assigned to the same assignee as the present application and is hereby incorporated by reference. Other electrode configurations are set forth at U.S. Pat. Nos. 5,729,565 and 4,860,300, which are hereby incorporated by reference. Preferred preionization units are set forth at U.S. patent application Ser. Nos. 09/692,265 and 09/247,887, which are assigned to the same assignee as the present application and are hereby incorporated by reference. The preferred solid state pulser module 4 and the high voltage power supply 8 are set forth at U.S. Pat. Nos. 6,020,723 and 6,005,880 and U.S. patent application Ser. No. 09/640,595, which are assigned to the same assignee as the present application and are hereby incorporated by reference into the present application.

The resonator includes optics for line-narrowing and/or line-selection and also preferably for further narrowing the selected line. Many variations are possible for this purpose, those shown in U.S. Pat. Nos. 4,399,540, 4,905,243, 5,226,050, 5,559,816, 5,659,419, 5,663,973, 5,761,236, 6,081,542, 6,061,382, and 5,946,337, and U.S. patent application Ser. Nos. 09/317,695, 09/130,277, 09/244,554, 09/317,527, 09/073,070, 09/452,353, 09/602,184, 09/629,256, 09/599,130, 60/170,342, 60/172,749, 60/178,620, 60/173,993, 60/166,277, 60/166,967, 60/167,835, 60/170,919, 60/186,096, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application. Some of the line selection and/or line narrowing techniques set forth in these patents and patent applications may be used in combination.

The processor 16 is also shown connected to an interface 24. The interface 24 allows the processor 16 to communicate with a stepper/scanner computer 26 associated with the imaging system. The interface 24 also allows the processor 16 to communicate with control units 28 at a hand held terminal, also associated with the imaging system or otherwise at the fab.

As shown in FIG. 1, the processor 16 receives various inputs at interfaces labeled 21–26. The processor 16 may receive many other inputs and may not receive all of the inputs at interfaces 21–26 as shown depending on the configurational specifications of the laser system. In addition, some of the modules may communicate directly with each other, e.g., some of the modules may be configured with their own microprocessors. The processor shown at FIG. 1 is limited to receiving inputs at interfaces 21–26 for the purposes of illustrating the advantages of the preferred embodiment.

Input at interface 21 to the processor 16 is received from the power supply 8. Input at interface 22 is received from the gas handling module 6. Input at interface 23 is received from the optics control module 14. Input at interface 24 is received from the diagnostic module 18. Input at interface 25 is received from the pulser module 4. Input at interface 26 is received from the interface 24 connected to the stepper/scanner computer 26 and control units 28 of the fab.

During operation of the laser system shown at FIG. 1, the processor 16 receives the inputs at interfaces 21–26 and sends control signals out to various modules based on the inputs received at interfaces 21–26. The processor 16 may send signals out to the power supply 8 through interface 21, to the gas handling module 6 through interface 22, to the optics control module 14 through interface 23, to the diagnostic module 18 through interface 24, to the pulser module 4 through interface 25, and to the interface 24 through interface 26. In this way, the processor 16 monitors and controls various modules of the laser system.

As stated above, a problem arises when there is no laser system available to receive inputs through interfaces 21–26, even though it is desired to test and run software for controlling the processor 16. The problem may arise when the laser system is still under development, or when an operating laser system that has been developed is simply not available for connecting the processor 16 through the various interfaces 21–26 to the various modules of the laser system, as shown in FIG. 1.

Figure 2:
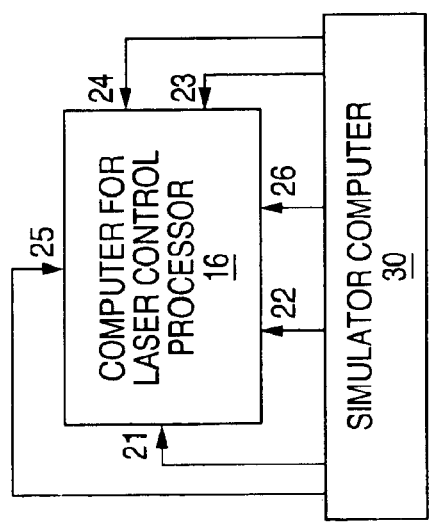
FIG. 2 schematically illustrates a laser control computer connected to a second computer running laser simulation software in accord with a first embodiment.

FIG. 2 shows a processor 16 connected to a simulation computer 30 through the same interfaces 21–26 shown and described at FIG. 1. The simulator computer 30 is configured for and is connected to the processor 16 through interfaces 21–26, just as the various component modules of the laser system would be connected in accord with FIG. 1. As far as the processor 16 is concerned, the processor 16 is connected at the same interfaces 21–26 as it would be if it were connected into a fully operational laser system, such as that schematically shown at FIG. 1.

The simulator computer 30 is equipped with software including a software program for simulating an operating laser system, such as the one schematically shown at FIG. 1, in accord with the first aspect of the invention. The simulator program generates one or more dummy parameters each corresponding to a parameter of the operating laser system. The dummy parameters are sent to the processor 16 from the simulator computer 30 over the same interfaces 21–26 that the component modules of the laser system of FIG. 1 would if the processor 16 were connected thereto. The dummy parameters are received and read by the processor 16 which is running a test software subroutine having the laser system parameters corresponding to the dummy parameters as inputs. As such, the dummy parameters have preferably the same or similar values as the laser system parameters that the component modules of the laser system would send to the processor 16, again if the processor 16 were connected in the laser system according to FIG. 1.

The software loaded on the processor 16 processes the dummy parameters just as the processor 16 would process corresponding laser system parameters. The processor 16 then generates and sends output commands based on the values of the dummy parameters through the interfaces 21–26 to the simulator computer 30. The simulator computer 30 is preferably equipped to receive, store and/or display the generated output commands and/or the effect on a simulated laser system that the output commands would have just as if the output commands were issued to the various modules of an operating laser system. The algorithm having the laser system parameter as an input may be advantageously developed and tested separately from the operating laser system.

Figure 3:
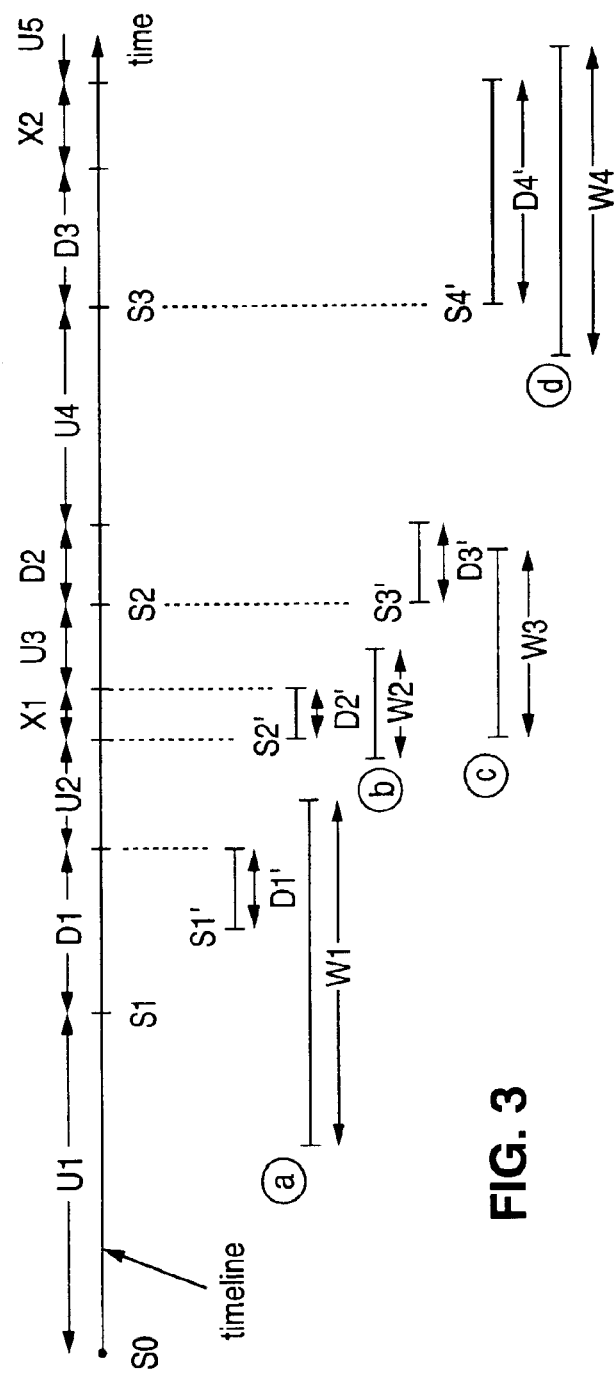
FIG. 3 illustrates a laser service routine schedule written to minimize lithography system downtime in accord with a second embodiment.

FIG. 3 illustrates a second embodiment wherein a laser service routine schedule is written to minimize lithography system downtime. A timeline is shown depicting various time durations including lithography system uptimes U1–U5, and downtimes D1–D3 and X1–X2. The timeline also shows the start times S1–S3 of the downtimes D1–D3, and the start time S0 of the lithography processing. The timeline is a continuously running time from the start time S0 representing the start of lithography processing, e.g., with a new project. Each of the times U1–U5, D1–D3 and X1–X2 along the timeline represent durations of time during the ongoing lithography processing according to states of the processing. The various durations depicted in FIG. 3 are not drawn to a realistic scale and are only depicted to illustrate this embodiment.

The uptimes U1–U5 represent time durations when chips are actually being exposed by the laser. The downtimes D1–D3 and X1–X2 represent time durations when chips are not being exposed by the laser. The downtimes D1–D3 are scheduled downtimes of the lithography system not having to do with scheduled service of the laser system, and are determined at the fab. As mentioned above, the timeline including the uptimes U1–U5 and the downtimes D1–D3 are communicated to personnel associated with the laser system in advance by personnel at the fab or otherwise associated with the lithography system. The downtimes X1–X2 are imposed on the lithography system due to unavoidable scheduled servicing of the laser system that could not be scheduled during scheduled downtimes D1–D3 of the lithography system.

Scheduled laser service routines are depicted as labeled (a)–(d) in FIG. 3. These scheduled laser service routines are temporally located to correspond to times along the timeline when laser service routines are to be performed. The durations W1–W4 are windows of time anywhere within which the scheduled service associated with the laser service routines (a)–(d), respectively, could be started. The durations D1'–D4' are the temporal durations of the scheduled laser service routines (a)–(d), respectively, or the time it takes to perform the scheduled laser service routines (a)–(d). The windows W1–W4 and the durations D1'–D4' are set in advance and are constraints on the real laser system (ideally they would not exist).

Each of the lithography system uptimes U1–U5, the downtimes D1–D3 of the lithography system not having to do with scheduled service of the laser system, the windows W1–W4 and the durations D1'–D4' are inputs to a processor running a computer program in accord with the second aspect of the invention. The program computes the start times S1'–S4' according to its programming. The windows W1–W4 and the durations D1'–D4' may be adjustable depending on their relative values, and the program takes that into consideration in its determination of the start times S1'–S4'. The start times S1'–S4' are advantageously determined by the program such that the downtimes (i.e., X1, X2, etc.) associated with scheduled service of the laser system that could not be scheduled during lithography system downtimes D1–D3 are minimized. It follows that the overall uptime of the lithography system (i.e., U1+U2+U3+U4) is advantageously maximized along the entire timeline shown in FIG. 3.

The scheduled service routine (a) is advantageously scheduled to overlap entirely within the scheduled lithography system downtime D1. In this case, there is no downtime incurred due to the laser system service routine (a). The scheduled service routine (a) shows the start time S1' being set such that the scheduled service of the laser system is finished right about or just before the time the lithography system downtime D1 is ended and the lithography system is previously scheduled to be brought back up. The position of the start time S1' and thus the laser service duration D1' of the laser service routine (a) within the lithography system downtime duration D1 in this case may have been determined based on how other windows Wi may adjust depending on when the service routine (a) is completed. Again, the total schedule is set to minimize the total downtime incurred by the overall system due solely to scheduled laser system servicing.

The scheduled service routine (b) is unavoidably scheduled within a previously scheduled uptime of the lithography system. The program determined that there was no scheduled lithography system downtime D1–D3 within which the laser service routine (b) could have been performed. The start time S2' was nonetheless selected based on how future windows Wi and start times Si' would be affected by its positioning along the timeline to maximize total uptime of the system.

The third laser service subroutine (c) is, like routine (a), advantageously entirely overlapped with lithography system downtime D2. The duration D3' extends beyond the window W3, but the start time S3' is within the window W3, which is all that is required regarding the positioning of the duration D3' relative to the window W3, beyond minimizing the downtimes Xi.

The fourth laser service routine (d) shown in FIG. 3 overlaps the entire system downtime D3, as the start time S3 of the downtime D3 is at the start time S4' of the laser service duration D4'. However, the duration D4' is longer than the duration D3, and so downtime X2 was unavoidable. However, the selection of the start time S4' at the start time S3 rather than after S3 resulted in a shorter downtime X1. The start time S4' was not selected to be earlier than S3 because the overall sum of downtimes Xi was minimized by selecting that start time S4', even though setting S4' somewhat earlier time would not have reduced the overall downtime Xi associated directly to the laser service routine (d).

Figure 4:
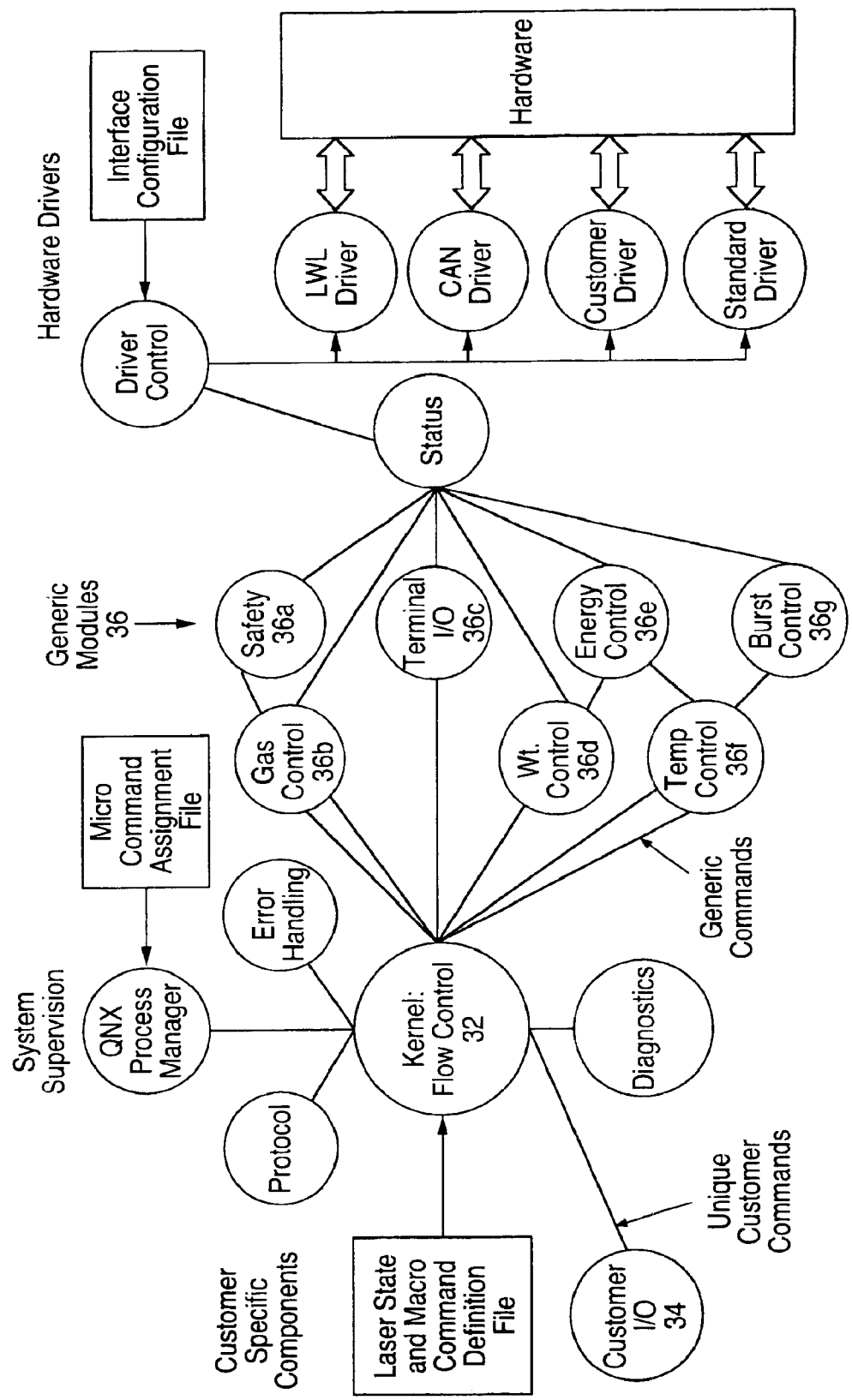
FIG. 4 illustrates the flow control kernel that receives unique customer commands and outputs generic laser system control commands in accord with a third embodiment.

FIG. 4 illustrates a flow control kernel 32 in accord with a third embodiment that receives unique customer commands from a unique customer I/O 34 and that vary depending on the customer. The kernel 32 outputs generic laser system control commands to generic control modules 36. As discussed above, unique control modules are conventionally created for each set of unique customer commands input from customer I/O 34. Advantageously, only a single set of generic control modules 36 are shown in FIG. 4 that may be used for any of multiple unique sets of customer commands or command sequences input from customer I/O 34.

The flow control kernel 32 advantageously converts the unique customer commands received from the customer I/O 34 into generic commands. The generic commands generated by the kernel from the unique commands it receives correspond to a laser function. The laser function is controlled by the generic modules 36. For example, one generic module 36 could be a laser safety module 36a such as might control a shutter. Other generic modules 36 might include a gas control module 36b, a terminal I/O module 36c, a wavelength (WL) control module 36d, an energy control module 36e, a temperature control module 36f and/or a burst control module 36g. The generic modules 36 control laser functions causing a shutter to close, the power to be turned up, a gas action to be performed, the wavelength to be adjusted, etc.

Advantageously, the kernel 32 is programmed to understand any command it might receive from the customer I/O unique to the particular customer involved. The kernel 32 may translate the commands using a universal translator or the kernel 32 may refer to a translation table of having each of the unique commands it may receive from the customer I/O corresponding to the generic command the kernel 32 is to send to the particular generic control module 32a–32g that deals with that particular generic command. Advantageously, software development time and costs are reduced according to the third aspect of the invention.

The objects of the invention are thus met. The laser simulation software programming loaded onto the simulator computer that is connected to the processor 16 through interfaces 21–26 as shown and described with respect to FIGS. 1–2 advantageously permits processor control software for next generation industrial lasers to be developed while the lasers themselves are being developed. The laser service scheduling program shown and described with respect to FIG. 3 advantageously minimizes lithography system downtimes and therefore maximizes lithography system uptime. The flow control kernel 32 shown and described with respect to FIG. 4 advantageously reduces laser control processor software development time and costs.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above, and the invention is not to limited by any description of the preferred embodiments, but is defined by the language of the appended claims, and structural and functional equivalents thereof.

What is claimed is:

1. A system for simulation of the operation of a laser system, and testing an operation of a laser control processor, the system including:
   a simulation processor programmed to generate one or more dummy parameters each corresponding to a parameter of an operating laser system;
   an interface coupled to the simulation processor, which provides for transmitting a signal including data corresponding to said one or more dummy parameters from the simulation processor;
   a laser control processor coupled to the simulation processor, through the interface, the laser control processor being programmed to receive the signal and use the one or more dummy parameters as input parameters which simulate an operating laser system, wherein the laser control processor operates to generate control signals based on the one or more dummy parameters.

2. The system of claim 1, wherein the simulation processor is programmed such that said one or more dummy parameters simulate operational parameters which would be generated in actual operation of the laser system.

3. In an industrial processing system which includes a laser system, a method for scheduling laser service routines based on an industrial processing system operating schedule the method including:
   providing a processor which is programmed to schedule an execution of laser service routines, wherein the processor operates to perform the steps of:
      reading the industrial processing system schedule including scheduled system uptimes and downtimes including start times and durations of said uptimes and downtimes;
      reading a time window and duration for each of one or more scheduled laser service routines;
      calculating a start time for each scheduled laser service routine within the time window of the service routine, wherein the start times are selected to collectively maximize temporal overlap of the scheduled laser service routine durations and scheduled industrial processing system downtime durations; and
      outputting the calculated start times.

4. The system of claim 3, wherein the processor performs the further step of writing a start time for each scheduled laser service routine.

5. A laser system having a processor for controlling operation of different components of the laser system, wherein the processor is programmed to perform the following method:
   reading a command unique to one of multiple external software control programs corresponding to a function of a laser system, each of said multiple external software control programs having a unique command corresponding to the function of the laser system;
   processing said command according to a flow control kernel to determine a generic command corresponding to said command, wherein
   said generic command is the same for each unique command of the multiple external software control programs; and
   outputting said generic command.

6. The system of claim 5, wherein the processor performs the further step of inputting the generic command to a generic control module corresponding to the laser system function.

7. The system of any of claim 5 or 6, wherein the flow control kernel includes a universal translator.

8. The system of any of claim 5 or 6, wherein the flow control kernel includes a translator table.

9. The system of claim 6, wherein the same generic control module is used for each of said unique commands corresponding to said multiple external software control programs.

* * * * *